O. Luce.
Hay-Raker & Loader.
No. 76215. Patented Mar. 31, 1868.

Witnesses:
S. C. Lemon,
C. A. Pettit

Inventor:
Orin Luce
By Munn & Co.
Attys.

United States Patent Office.

ORRIN LUCE, OF VIRGIL, NEW YORK, ASSIGNOR TO HIMSELF AND MARTIN LUCE, OF SAME PLACE.

*Letters Patent No. 76,215, dated March 31, 1868.*

IMPROVEMENT IN HAY-RAKERS AND LOADERS.

*The Schedule referred to in these Letters Patent and making part of the same.*

TO ALL WHOM IT MAY CONCERN:

Be it known that I, ORRIN LUCE, of Virgil, in the county of Cortland, and State of New York, have invented a new and improved Hay-Raker and Loader; and I do hereby declare that the following is a full, clear, and exact description of the construction and operation of the same, reference being had to the annexed drawings, making a part of this specification, in which—

Figure 1:
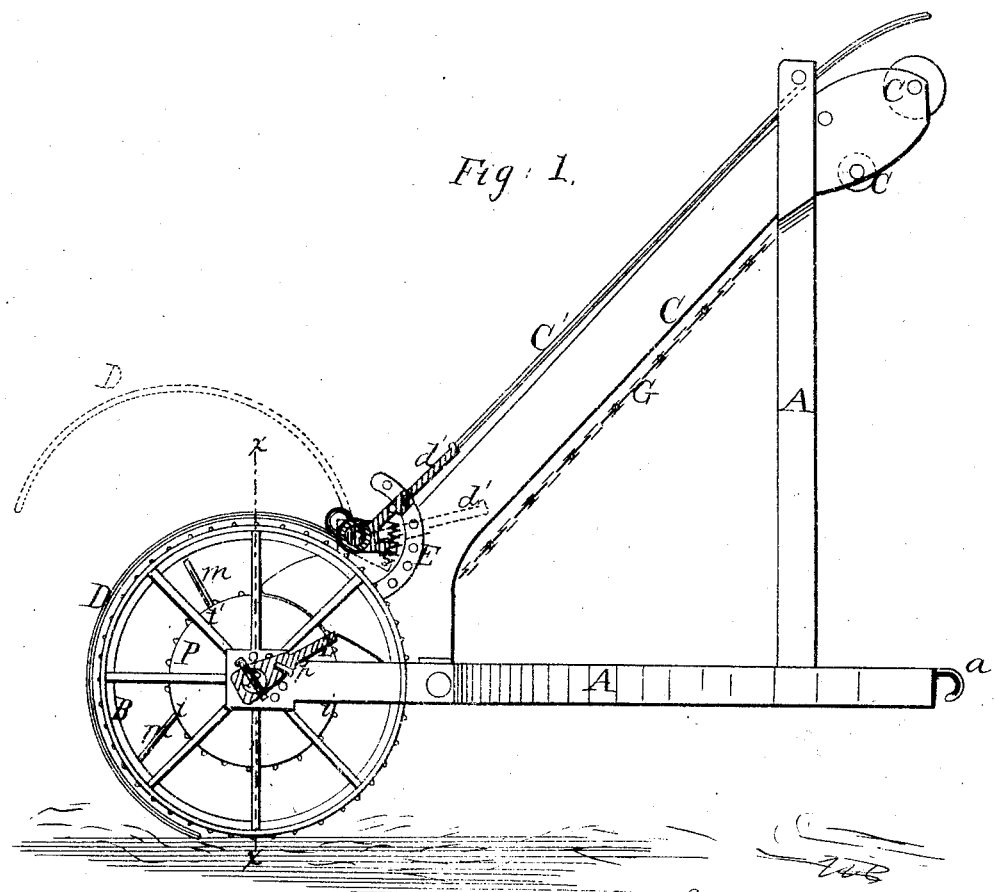
Figure 1 is a side elevation.

In this invention an improved adjustable device is employed for clearing the teeth and conveying the hay to the elevator, and in connection with it other novel devices are employed for raising and lowering the teeth and the clearing-apparatus.

In the drawings, A represents the frame of my machine, and $a$ is a hook for coupling it to the wagon in which the hay is to be loaded; B B are the draught-wheels running on a hollow hub, H'; C, the carrier or elevator; C' C', guide-rods to keep the hay on the carrier, and D D the rake-teeth, supported by a rocking-shaft, $d$, which can be rocked, so as to raise or lower the teeth by means of a lever, $d'$. E is a gauge, by which said lever can be fixed at any desired inclination, and $e$ is a spring which allows the rake-teeth to rise and pass over inequalities in the ground without breaking. Just inside of each draught-wheel is a rag-wheel, F, running on a hollow hub, H, in the same manner as the draught-wheels, and carrying one of the endless chains G G of the elevator. Straight bars I I I connect the rims of the two rag-wheels, forming a kind of open hollow cylinder, extending across the machine between the rag-wheels, and revolving with them. Within this revolving cylinder is a fixed bar, J, extending the whole length of the cylinder, and supported eccentrically as to it by means hereafter to be described.

This bar furnishes a bearing for several rotating arms $m\ m\ m$, one end of each of which is bent into a loop around the bar, the other end projecting loosely through a hole, $i$, in the bars I I I that compose the rim of the cylinder. The bar J being fixed and out of centre with the revolving cylinder, the arms $m\ m\ m$ will project through the holes $i\ i$ to a different degree on each side of the cylinder, extending farthest beyond the rim of the cylinder on the side nearest to which the bar J is stationed, and assuming the position shown in fig. 2. As the rag-wheels revolve, the arms $m\ m\ m$ will be caused to rotate, and, projecting considerably through the wall of the rotating cylinder on its under and rear sides, will pick up the hay, force it round against the teeth D D, and carry it up over the cylinder to the endless elevator C, upon which they will drop it, and retire within the cylinder by reason of their own eccentricity with the latter. When the cylinder moves round so far that the arms again assume a nearly vertical position, they will emerge from their holes, and again act upon the hay as before. One arm, $m$, will be arranged to operate between each pair of adjacent teeth D D.

Figures 2, 3:
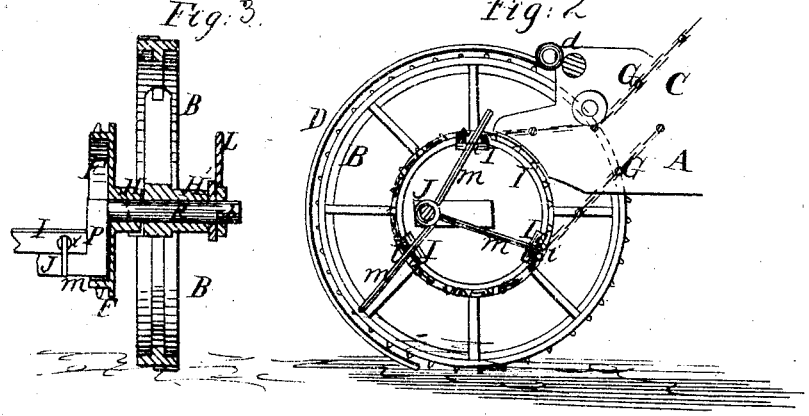
Figure 2 is a longitudinal vertical section.
Figure 3 is a vertical section of the wheels and axles, through the line $x\ x$ of fig. 1.

It is evident from the above that the bar J must be supported inside of the cylinder, so that the latter can revolve around it. In order to effect this, I make the hubs H H' of the draught-wheels and rag-wheels hollow, as shown in fig. 3, and support the bar J on the end of an arm or crank, P, attached to a cylindrical axle-shaft or spindle, R, that extends through the hollow hubs. The draught-wheel, rag-wheel, and cylinder can then revolve without imparting a rotating motion to the bar J. This also enables me to render the position of the bar J adjustable, which I accomplish by simply attaching a short lever, L, to the outer end of the axle or spindle R. As the handle of this lever is depressed or raised, the position of the bar J is correspondingly elevated or lowered. $o\ o\ o\ o$ are a series of holes by which, in connection with a pin, $p$, the lever L may be held in any required position. By depressing the lever and pinning it to the lower hole $o$, the bar J will be thrown up so far that the arms $m\ m\ m$ will not come near the ground in their revolutions—a thing which may be very desirable when driving to or from the field, or over rough ground. At the same time the rake-teeth D D may, by the lever $d'$, be thrown up out of the way, as shown in red lines in fig. 1.

The bar J, crank P, and spindle R, when cast in one piece, may form the axle-tree, the rag-wheel F and wheel B running separately upon it, as shown in fig. 3, and being connected by a clutch, or ratchet and pawl, which allows the wheel B to back without moving the rag-wheel, but when it moves forward communicates its motion to the rag-wheel and elevator. The axle or shaft R is prevented from turning with the wheel by means of a bolt, $b$, which passes through it and through the lever L. $e\ e\ e$ are rollers upon which the chains G G are carried.

Having thus described my invention, what I claim as new, and desire to secure by Letters Patent, is—

1. The eccentric-bar J, when supported as described, and operating in connection with the arms $m\ m\ m$, the revolving bars I I I, and the teeth D D, substantially as and for the purposes set forth.

2. The combination of the independent lever $d'$ with the rocking-shaft $d$, teeth D D, gauge E, and spring $e$, substantially as and for the purposes indicated.

ORRIN LUCE.

Witnesses:
CHAS. A. PETTIT,
N. K. ELLSWORTH.